US011338435B2

(12) United States Patent
Ishikawa et al.

(10) Patent No.: US 11,338,435 B2
(45) Date of Patent: May 24, 2022

(54) GRIPPING SYSTEM WITH MACHINE LEARNING

(71) Applicant: KABUSHIKI KAISHA YASKAWA DENKI, Kitakyushu (JP)

(72) Inventors: Shota Ishikawa, Fukuoka (JP); Koji Sokabe, Fukuoka (JP); Keisuke Nakamura, Fukuoka (JP); Masaru Adachi, Fukuoka (JP); Yuichi Sasaki, Tokyo (JP); Antoine Pasquali, Tokyo (JP); Thomas Wilmotte, Tokyo (JP)

( * ) Notice: Subject to any disclaimer, the term of this patent is extended or adjusted under 35 U.S.C. 154(b) by 736 days.

(21) Appl. No.: 16/195,556

(22) Filed: Nov. 19, 2018

(65) Prior Publication Data
US 2019/0152054 A1 May 23, 2019

(30) Foreign Application Priority Data
Nov. 20, 2017 (JP) .............................. JP2017-223053

(51) Int. Cl.
*G05B 15/00* (2006.01)
*G05B 19/00* (2006.01)
(Continued)

(52) U.S. Cl.
CPC ................ *B25J 9/163* (2013.01); *B25J 9/161* (2013.01); *B25J 9/1612* (2013.01); *B25J 9/1697* (2013.01);
(Continued)

(58) Field of Classification Search
CPC .......... A23F 3/16; G06N 3/02; G05B 13/027; G05B 2219/39057; G05B 2219/39289;
(Continued)

(56) References Cited

U.S. PATENT DOCUMENTS 5,446,835 A * 8/1995 Iida ........................ B25J 9/1687
700/259
9,205,558 B1 * 12/2015 Zevenbergen ......... B25J 9/1633
(Continued)

FOREIGN PATENT DOCUMENTS

CN 102126221 7/2011
CN 106094516 11/2016
(Continued)

OTHER PUBLICATIONS

Pinto Lerrel et al, "Supersizing self-supervision: Learning to grasp from 50K tries and 700 robot hours", 2016 IEEE International Conference on Robotics and Automation (ICRA), IEEE, May 16, 2016, P3406-P3413.
(Continued)

*Primary Examiner* — Harry Y Oh
(74) *Attorney, Agent, or Firm* — Soei Patent & Law Firm

(57) ABSTRACT

A gripping system includes a hand that grips a workpiece, a robot that supports the hand and changes at least one of a position and a posture of the hand, and an image sensor that acquires image information from a viewpoint interlocked with at least one of the position and the posture of the hand. Additionally, the gripping system includes a construction module that constructs a model by machine learning based on collection data. The model corresponds to at least a part of a process of specifying an operation command of the robot based on the image information acquired by the image sensor and hand position information representing at least one of the position and the posture of the hand. An operation module executes the operation command of the robot based on the image information, the hand position information, and the model, and a robot control module operates the robot based on the operation command of the robot operated by the operation module.

20 Claims, 12 Drawing Sheets

(51) Int. Cl.
    *B25J 9/16*         (2006.01)
    *G05B 13/02*      (2006.01)
    *B25J 15/08*      (2006.01)
    *G06N 3/02*       (2006.01)

(52) U.S. Cl.
    CPC ............ *B25J 15/08* (2013.01); *G05B 13/027* (2013.01); *G05B 2219/39057* (2013.01); *G05B 2219/39289* (2013.01); *G05B 2219/40053* (2013.01); *G06N 3/02* (2013.01)

(58) Field of Classification Search
    CPC . G05B 2219/40053; B25J 15/08; B25J 9/161; B25J 9/1612; B25J 9/163; B25J 9/1697
    See application file for complete search history.

(56) References Cited

U.S. PATENT DOCUMENTS

| | | | | |
|---|---|---|---|---|
| 9,527,209 | B2* | 12/2016 | Harada | B25J 9/1697 |
| 9,616,568 | B1* | 4/2017 | Russell | B25J 9/1697 |
| 10,675,763 | B2* | 6/2020 | Watanabe | B25J 9/1697 |
| 11,065,767 | B2* | 7/2021 | Domae | B25J 9/1666 |
| 2011/0141251 | A1* | 6/2011 | Marks | G06T 7/11 348/61 |
| 2012/0059517 | A1* | 3/2012 | Nomura | B25J 9/1679 700/259 |
| 2012/0165986 | A1* | 6/2012 | Fuhlbrigge | B25J 9/1687 700/259 |
| 2013/0006423 | A1* | 1/2013 | Ito | B25J 9/1612 700/259 |
| 2013/0166061 | A1* | 6/2013 | Yamamoto | B25J 9/1697 700/214 |
| 2014/0121836 | A1* | 5/2014 | Ban | B25J 9/0093 700/259 |
| 2014/0147240 | A1* | 5/2014 | Noda | B25J 19/021 414/751.1 |
| 2014/0163731 | A1* | 6/2014 | Shi | B25J 9/1669 700/250 |
| 2014/0163737 | A1* | 6/2014 | Nagata | B25J 9/1697 700/259 |
| 2014/0277731 | A1 | 9/2014 | Kamiya et al. | |
| 2015/0120054 | A1 | 4/2015 | Watanabe | |
| 2015/0142171 | A1* | 5/2015 | Li | B25J 9/1692 700/251 |
| 2016/0075031 | A1* | 3/2016 | Gotou | B25J 9/1697 700/259 |
| 2016/0167228 | A1* | 6/2016 | Wellman | B25J 9/1697 700/218 |
| 2016/0207195 | A1* | 7/2016 | Eto | B25J 9/1612 |
| 2016/0300125 | A1* | 10/2016 | Barker | G06T 7/0004 |
| 2017/0028562 | A1 | 2/2017 | Yamazaki et al. | |
| 2017/0136632 | A1 | 5/2017 | Wagner et al. | |
| 2017/0252922 | A1* | 9/2017 | Levine | G06N 3/08 |
| 2017/0252924 | A1* | 9/2017 | Vijayanarasimhan | G06N 3/084 |
| 2017/0270631 | A1 | 9/2017 | Melikian et al. | |
| 2017/0282363 | A1* | 10/2017 | Yamada | B25J 9/1612 |
| 2018/0089589 | A1* | 3/2018 | Ooba | B25J 9/163 |
| 2018/0126553 | A1* | 5/2018 | Corkum | B25J 9/1697 |
| 2018/0272535 | A1* | 9/2018 | Ogawa | B25J 9/1692 |
| 2019/0001489 | A1* | 1/2019 | Hudson | G06N 3/084 |
| 2019/0005374 | A1* | 1/2019 | Shankar | G06N 3/084 |
| 2019/0344446 | A1* | 11/2019 | Goto | B25J 9/1692 |
| 2019/0361672 | A1* | 11/2019 | Odhner | B25J 9/1697 |
| 2019/0366539 | A1* | 12/2019 | Arisoy | B25J 9/1612 |
| 2020/0171665 | A1* | 6/2020 | Kono | B25J 9/1664 |
| 2020/0275590 | A1* | 8/2020 | Nakayama | H05K 13/0813 |

FOREIGN PATENT DOCUMENTS

| | | |
|---|---|---|
| CN | 106874914 | 6/2017 |
| CN | 107139179 | 9/2017 |
| JP | H7-080790 | 3/1995 |
| JP | H7-160881 | 6/1995 |
| JP | H8-030327 | 2/1996 |
| JP | 2009-083095 | 4/2009 |
| JP | 2010-069542 | 4/2010 |
| JP | 2011-011315 | 1/2011 |
| JP | 2013-052490 | 3/2013 |
| JP | 2014-180704 | 9/2014 |
| JP | 2013-002099 | 2/2015 |
| JP | 2017-064910 | 4/2017 |
| JP | 2017-185578 | 10/2017 |

OTHER PUBLICATIONS

Sergey Levine et al, "Learning hand-eye coordination for robotic grasping with deep learning and large-scale data collection", The International Journal of Robotics Research., vol. 37, No. 4-5, Jun. 12, 2017, P421-P436.

Search Report in corresponding European Application No. 18207129.0, dated Apr. 23, 2019.

Office Action issued in European Patent Application No. 18207129.0, dated Apr. 15, 2021.

Office Action issued in Japanese Patent Application No. P2017-223053, dated Oct. 8, 2019 (with English partial translation).

Extended Search Report in corresponding European Application No. 18207129.0, dated Aug. 28, 2019.

Office Action issued in Chinese Patent Application No. 201811364672.5, dated Aug. 25, 2021 (with English partial translation).

Office Action issued in Chinese Patent Application No. 201811364672.5, dated Mar. 10, 2022 (with English partial translation).

\* cited by examiner

TIME:0

TIME:t

TIME:T

GRIPPING SYSTEM WITH MACHINE LEARNING

CROSS-REFERENCE TO RELATED APPLICATIONS

This application claims the benefit of priority from Japanese Patent Application No. 2017-223053, filed Nov. 20, 2017, the entire contents of which are incorporated herein by reference.

FIELD

The present disclosure relates to a gripping system, a learning device, a gripping method, and a model manufacturing method.

BACKGROUND

Japanese Unexamined Patent Publication No. 2010-069542 discloses a gripping method for gripping a plurality of bulk-loaded workpieces with a hand of a robot. In this method, a distance of the workpiece is measured by a distance sensor fixedly disposed on the workpiece and a measurement result and a 3D CAD model of the workpiece are collated, so that a three-dimensional position and a posture of the individual workpiece are recognized. After the three-dimensional position and the posture of the individual workpiece are recognized, a gripping operation of the workpiece starts.

SUMMARY

Disclosed herein is an example gripping system. The gripping system may include a hand that grips a workpiece, a robot that supports the hand and changes at least one of a position and a posture of the hand, and an image sensor that acquires image information from a viewpoint interlocked with at least one of the position and the posture of the hand. Additionally, the gripping system may include a construction module that constructs a model by machine learning based on collection data. The model may correspond to at least a part of a process of specifying an operation command of the robot based on the image information acquired by the image sensor and hand position information representing at least one of the position and the posture of the hand. The gripping system may further include an operation module that derives, executes, actuates, generates, specifies or selects the operation command of the robot based on the image information, the hand position information, and the model, and a robot control module that actuates or operates the robot based on the operation command of the robot.

Other example gripping systems disclosed herein may include a hand that grips a workpiece, a robot that supports the hand and changes at least one of a position and a posture of the hand, and an image sensor that acquires image information from a viewpoint interlocked with at least one of the position and the posture of the hand. The example gripping system may further include an operation module that derives, executes, actuates, generates, specifies or selects an operation command of the robot based on the image information, hand position information representing at least one of the position and the posture of the hand, and a model corresponding at least a part of a process of specifying the operation command of the robot. In some examples, the model may be constructed by machine learning based on collection data. A robot control module may be configured to actuate or operate the robot based on the operation command of the robot.

Additionally, an example learning device is disclosed herein. The learning device may include an acquisition module that acquires image information imaged from a viewpoint interlocked with at least one of a position and a posture of a hand gripping a workpiece, and that acquires hand position information representing at least one of the position and the posture of the hand. The learning device may further include a construction module that constructs a model by machine learning based on collection data including the image information and the hand position information. In some examples, the model corresponds to at least a part of a process of specifying an operation command of a robot based on the image information and the hand position information acquired by the acquisition module.

Additionally, an example gripping method is disclosed herein. The gripping method may include acquiring image information from a viewpoint interlocked with at least one of a position and a posture of a hand gripping a workpiece, and constructing a model, by machine learning, based on collection data. The model may correspond to at least a part of a process of specifying an operation command of a robot based on the image information and hand position information representing at least one of the position and the posture of the hand. Additionally, the method may include executing, actuating, generating, specifying or selecting the operation command of the robot based on the image information, the hand position information, and the model, and operating the robot based on the operation command of the robot.

Additionally, an example gripping method is disclosed herein. The gripping method may include acquiring image information from a viewpoint interlocked with at least one of a position and a posture of a hand gripping a workpiece, and executing, actuating, generating, specifying or selecting an operation command of a robot based on the image information, hand position information representing at least one of the position and the posture of the hand, and a model corresponding to at least a part of a process of specifying the operation command of the robot. The model may be constructed by machine learning based on collection data. The method may further include operating the robot based on the operation command of the robot.

An example model manufacturing method is also disclosed herein. The model manufacturing method may include acquiring image information imaged from a viewpoint interlocked with at least one of a position and a posture of a hand gripping a workpiece and hand position information representing at least one of the position and the posture of the hand. Additionally, the model manufacturing method may include constructing a model corresponding to at least a part of a process of specifying an operation command of a robot based on the image information and the hand position information. The model may be constructed by machine learning based on collection data including the image information and the hand position information.

DETAILED DESCRIPTION

Figure 1:
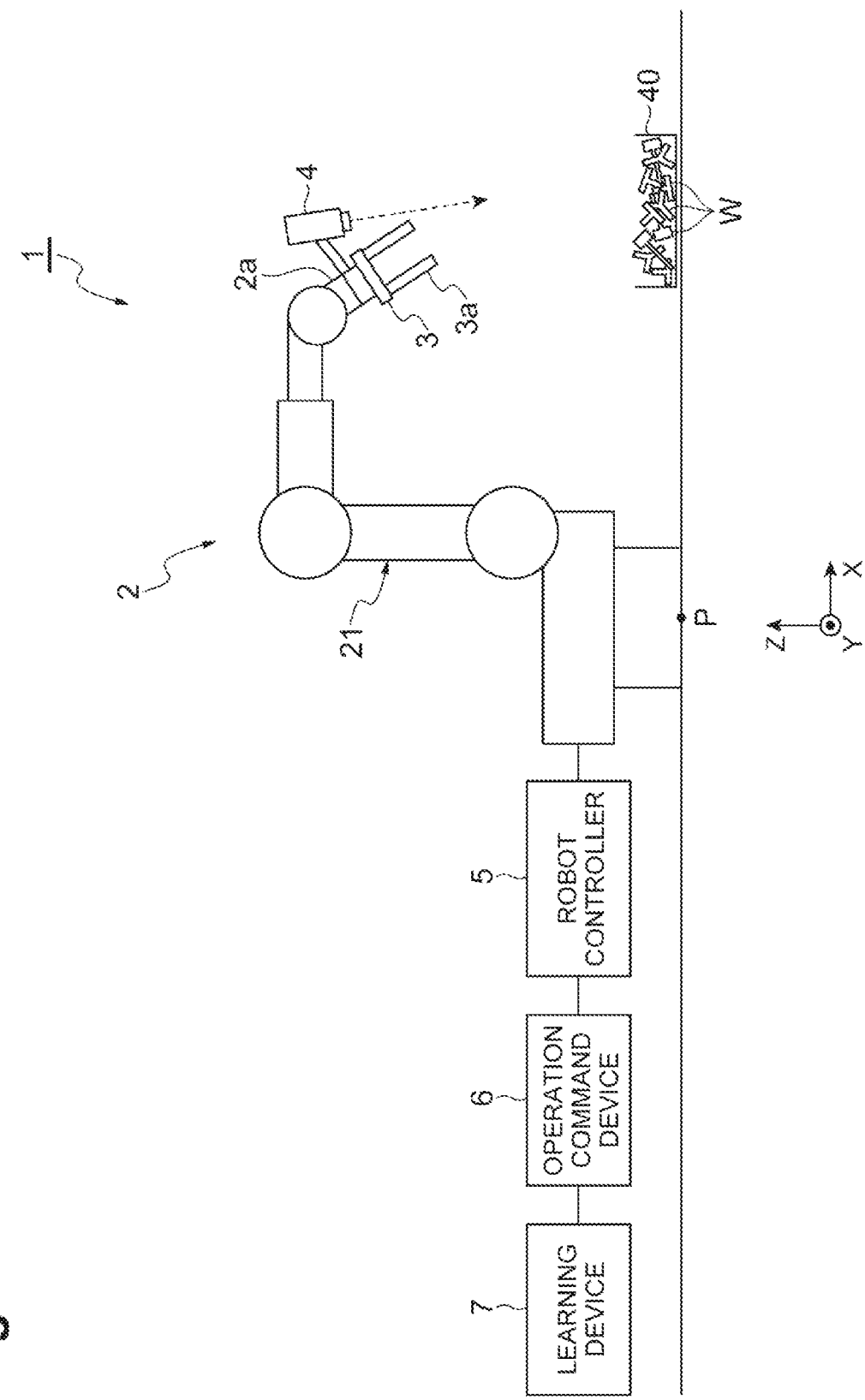
FIG. 1 is a schematic diagram illustrating an example gripping system.

Hereinafter, embodiments will be described in detail with reference to the drawings. In the description of the drawings, the same elements or elements having the same function are denoted by the same reference numerals and redundant explanation may be omitted.

[Configuration of Gripping System]

FIG. 1 is a schematic diagram illustrating an example gripping system 1. The gripping system 1 shown in FIG. 1 may be configured to cause a robot 2 to execute an operation of gripping workpieces W, including gripping objects and automating various operations such as processing and assembling. The gripping system 1 performs learning regarding the gripping operation of the robot 2 and commands the robot 2 to execute the gripping operation based on a learning result.

The gripping system 1 includes a robot 2, a hand 3, an image sensor 4, a robot controller 5 (for example a robot control module), an operation command device 6, and a learning device 7.

The robot 2 supports the hand 3 gripping the workpiece W and changes at least one of a position and a posture of the hand 3. The robot 2 may include, for example, a multi-axis (for example, six-axis or seven-axis) serial link type vertical articulated robot configured to execute various operations in a state where the hand 3 is supported at a tip portion 2a. The robot 2 may be configured to change the position and the posture of the hand 3 in a predetermined range and may include a 6-axis vertical articulated robot. In other examples, the robot 2 may include a seven-axis vertical articulated robot in which one redundant axis is added to six axes, or other types of multi-axis robots.

The hand 3 may include an end effector that grips the workpiece W. An example of the hand 3 is a gripper that grips the gripping object by opening and closing operations of a pair of claw members 3a. The hand 3 may include other types of apparatus which have a gripping function, for example, a gripper having three or more claw members or an apparatus including an adsorption type end effector.

In some examples, the robot 2 grips one workpiece W among a plurality of workpieces W arranged in a bucket 40. The workpieces W have various shapes and sizes. Examples of the workpieces W include a bolt, a nut, an electronic component, and the like. The workpieces W in the bucket 40 are in an unaligned state (a so-called bulk-loaded state). The workpieces W may be workpieces that can be gripped and a quantity, a shape, a size, and an arrangement are not limited. For example, only one workpiece W may be arranged in the bucket 40. The plurality of workpieces W arranged in the bucket 40 may have the same shape or may be a combination of a plurality of types of workpieces having different shapes. The workpieces W in the bucket 40 may be aligned. In addition to rigid bodies, the workpieces W may include elastic bodies. In some examples, the workpieces W may be arranged on a workbench or the like.

The image sensor 4 may include a detector that acquires image information. Examples of the image sensor 4 include a camera, a charge-coupled device (CCD) image sensor, a complementary MOS (CMOS) image sensor, and the like. The image sensor 4 acquires a pixel value as an example of image information. The pixel value is color information such as a color tone and a gradation and includes, for example, a brightness value.

The image sensor 4 acquires image information from a viewpoint interlocked with at least one of the position and the posture of the hand 3. The viewpoint is a position that becomes a starting point of an imaging direction of the image sensor 4. The viewpoint interlocked with at least one of the position and the posture of the hand 3 may include a viewpoint that is changed in accordance with at least one of the position and the posture of the hand 3. As an example, the image sensor 4 is fixed to the hand 3. In some examples, the image sensor 4 acquires image information from a viewpoint interlocked with both the position and the posture of the hand 3. The image sensor 4 may be fixed to the tip portion 2a of the arm portion 21 of the robot 2. As an example, the image sensor 4 may be arranged such that the tip of the hand 3 is included in the image information.

The robot controller 5 actuates or operates the robot 2 based on an operation command of the robot 2. The operation command is information for operating the robot 2. The operation command includes information regarding the gripping operation. The operation command includes, for example, a gripping target position and a target posture angle. The gripping target position is a final position of the hand 3 at timing when the workpiece W is gripped. The gripping target position may be defined in a robot coordinate system set to the robot 2, for example. As an example of the robot coordinate system, a direction vertical to an arrangement surface on which the robot 2 is arranged may be set to a Z direction, a direction parallel to the arrangement surface may be set to an X direction, and a direction orthogonal to the X direction and the Z direction may be set to a Y direction. In addition, for example, a point where the robot 2 is fixed to the arrangement surface may be a fixed point P and the fixed point P may be set to an original point of the robot coordinate system. The gripping target position may be represented by a relative position. The robot controller 5 calculates a joint angle target value (angle target value of each joint of the robot 2) for matching the position and the posture of the hand 3 with the gripping target position and the target posture angle. Additionally, the robot controller 5 actuates or operates the robot 2 in accordance with the joint angle target value. The operation command may not be the gripping target position.

The operation command device 6 may be configured to execute, generate, actuate, specify or select the operation command of the robot 2 based on the image information acquired by the image sensor 4, hand position information representing at least one of the position and the posture of the hand 3, and a model (e.g., the system model).

The model may include, for example, a program module that generates an output for an input. As an example, the model is a neural network that is specified by a node and a parameter. The model may include an object constructed by machine learning based on collection data and may correspond to at least a part of a process of specifying the operation command of the robot 2. For example, the process of specifying the operation command includes at least one of a recognition process of recognizing the workpiece W from the image information, an extraction process of extracting a feature amount corresponding to the workpiece W from the image information, a command output process of outputting an operation command based on the feature amount corresponding to the workpiece W and the position of the hand 3, and a gripping probability calculation process of calculating a gripping probability based on the feature amount corresponding to the workpiece W and the operation command. The gripping probability is a probability that the workpiece W can be gripped. In some examples, the model may include a Bayesian network (intelligent system that supports decision making of a user under a reliable information environment), or an input/output table.

At least a part of the process of specifying the operation command of the robot 2 may include the extraction process. At least a part of the process of specifying the operation command of the robot 2 may include the command output process. In some examples, at least a part of the process of specifying the operation command of the robot 2 may include the extraction process and the command output process. In still other examples, at least a part of the process of specifying the operation command of the robot 2 may include the extraction process, the command output process, and the gripping probability calculation process.

The collection data is prior data collected before learning and includes data regarding the gripping operation. The collection data may include, for example, history data of the robot 2 or learning data for recognizing the workpiece W. The history data of the robot 2 includes one or more of the image information acquired by the image sensor 4, the feature amount acquired from the image information by the operation command device 6, the operation command and the gripping probability output by the operation command device 6, the hand position information output by the robot controller 5, and the like, or any combination thereof. The hand position information may include information representing at least one of the position and the posture of the hand 3, in addition to other types of information for guiding the position and the posture of the hand 3. For example, the hand position information may be a relative vector or a motor torque.

The learning device 7 may be configured to construct the model. For example, the learning device 7 may be configured to acquire image information imaged from a viewpoint interlocked with at least one of the position and the posture of the hand 3 gripping the workpiece W, and to acquire hand position information representing at least one of the position and the posture of the hand 3. Additionally, the learning device 7 may be configured to construct a model, by machine learning based on collection data including the image information and the hand position information, corresponding to at least a part of the process of specifying the operation command of the robot 2 based on the image information and the hand position information.

[Hardware Configuration of Operation Command Device]

Figure 2:
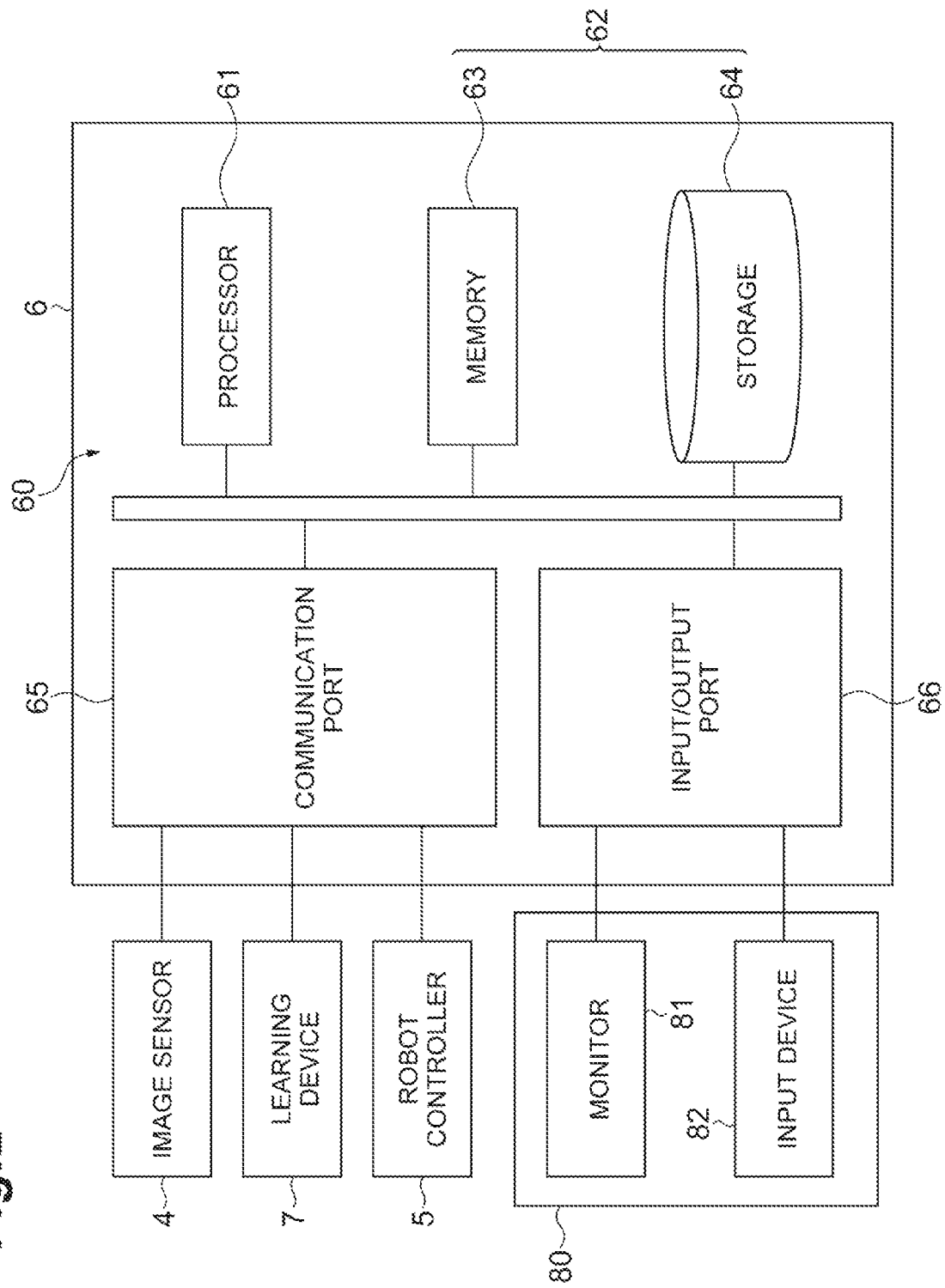
FIG. 2 is a block diagram illustrating an example hardware configuration of an operation command device.

FIG. 2 is a block diagram illustrating an example hardware configuration of the operation command device 6. The operation command device 6 includes a circuit 60 that has one or more processors 61, a storage module 62, a communication port 65, and an input/output port 66. The storage module 62 includes a memory 63 and a storage 64. The storage 64 records a program for configuring a functional module of the operation command device 6. The storage 64 may be any storage as long as it can be read by a computer. Specific examples include a hard disk, a non-volatile semiconductor memory, a magnetic disk, an optical disk, and the like. The memory 63 temporarily stores a program loaded from the storage 64, an operation result of the processor 61, and the like. The processor 61 executes the program in cooperation with the memory 63 to configure each functional module.

The communication port 65 inputs and outputs an electric signal into/from the robot controller 5, the image sensor 4, and the learning device 7, in accordance with a command from the processor 61. The input/output port 66 inputs and outputs an electric signal into/from a user interface 80, in accordance with a command from the processor 61. The user interface 80 includes a monitor 81 and an input device 82.

[Hardware Configuration of Learning Device]

Figure 3:
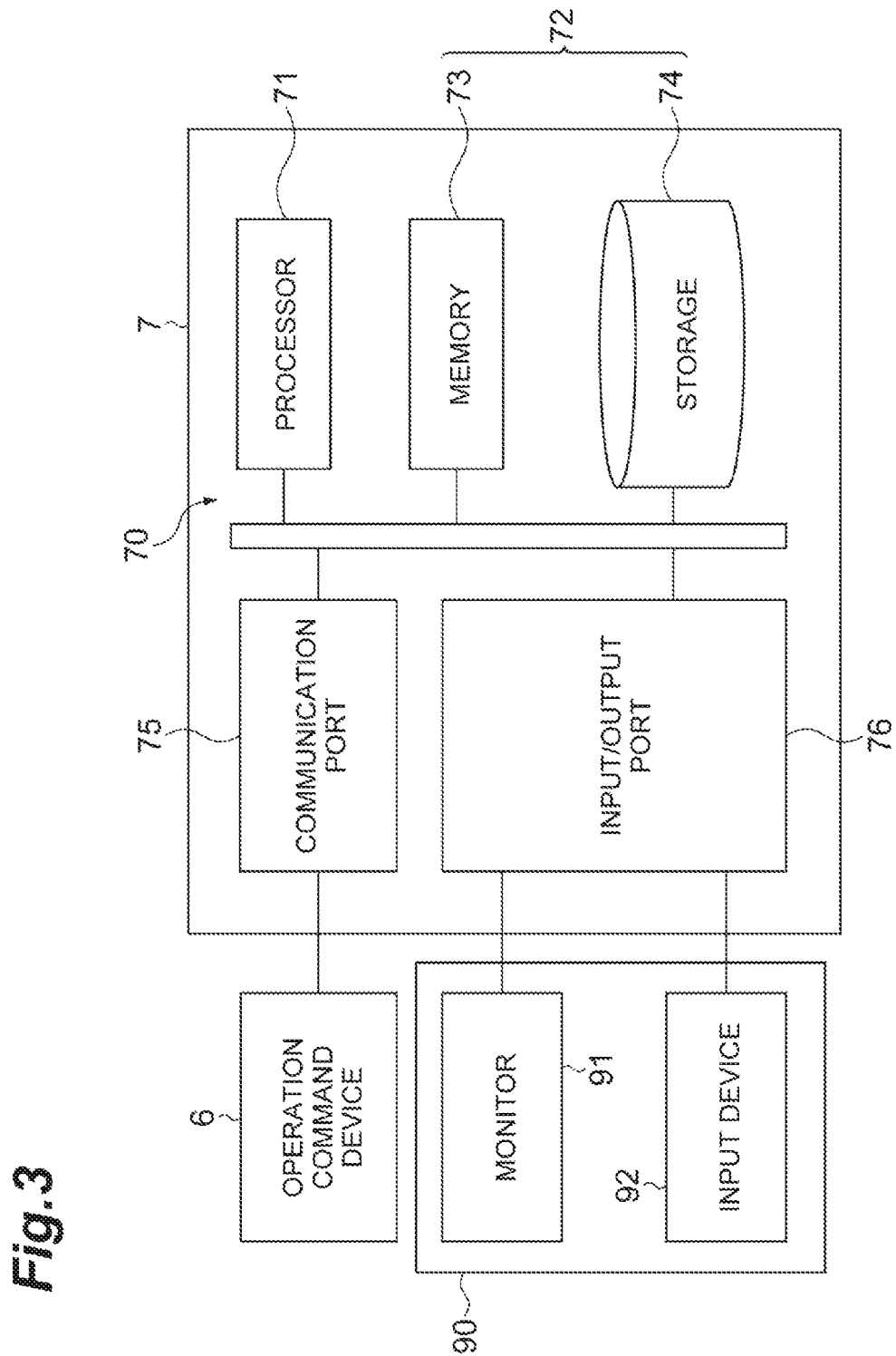
FIG. 3 is a block diagram illustrating an example hardware configuration of a learning device.

FIG. 3 is a block diagram illustrating an example hardware configuration of the learning device 7. The learning device 7 includes a circuit 70 that has one or more processors 71, a storage module 72, a communication port 75, and an input/output port 76. The storage module 72 includes a memory 73 and a storage 74. The storage 74 records a program for configuring the functional module of the learning device 7. The storage 74 may be any storage as long as it can be read by a computer. Specific examples include a hard disk, a non-volatile semiconductor memory, a magnetic disk, an optical disk, and the like. The memory 73 temporarily stores a program loaded from the storage 74, an operation result of the processor 71, and the like. The processor 71 executes the program in cooperation with the memory 73 to configure each functional module.

The communication port 75 inputs and outputs an electric signal between the operation command device 6 and the communication port 75, according to a command from the processor 71. The input/output port 76 inputs and outputs an electric signal between the user interface 90 and the input/output port 76, according to a command from the processor 71. The user interface 90 includes a monitor 91 and an input device 92.

[Functional Configuration of Operation Command Device]

Figure 4:
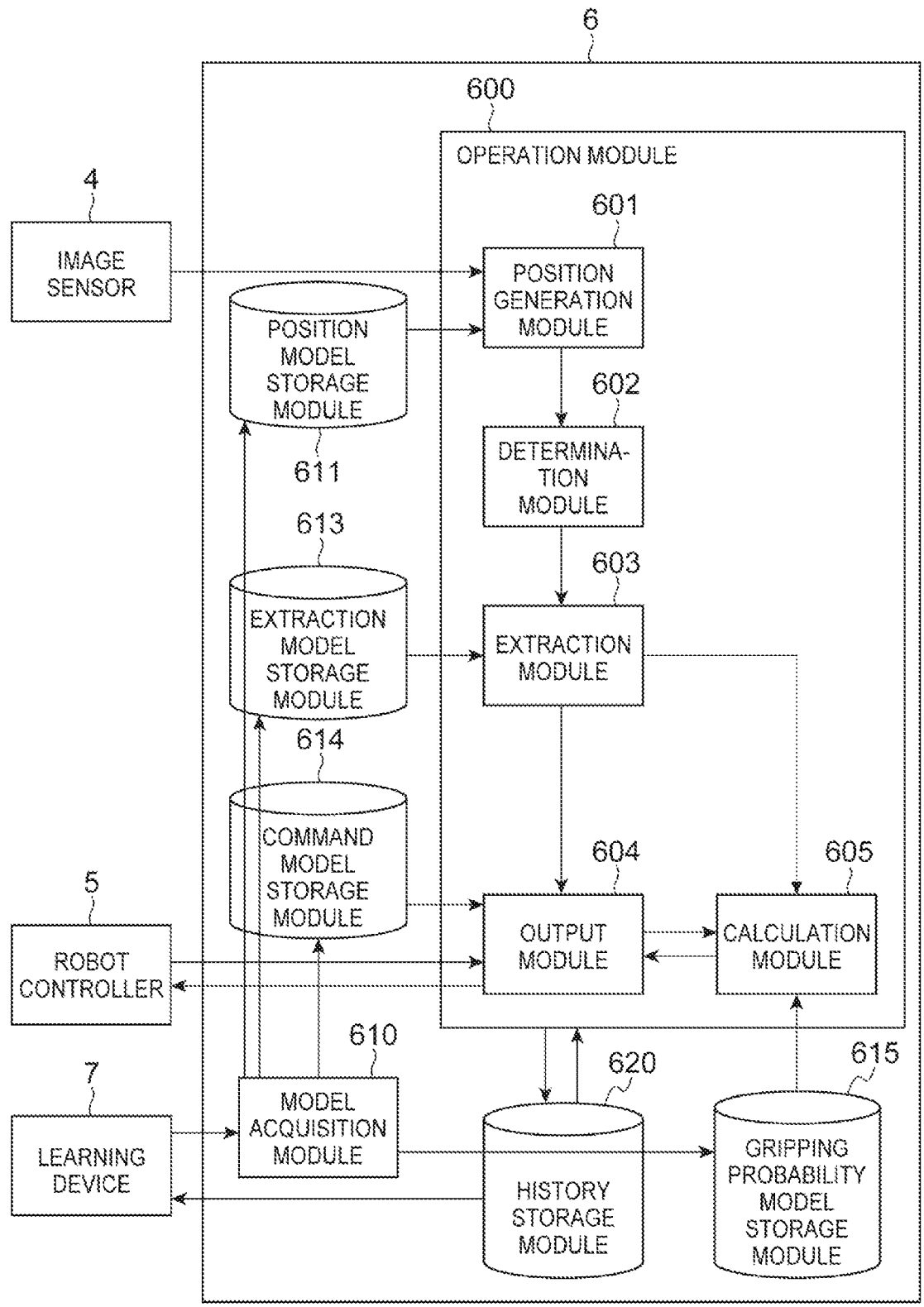
FIG. 4 is a block diagram illustrating an example functional configuration of an operation command device.

FIG. 4 is a block diagram illustrating an example functional configuration of the operation command device 6. The operation command device 6 has an operation module 600 and a model acquisition module 610.

The operation module 600 derives, executes, actuates, generates, specifies or selects an operation command of the robot 2 based on the image information, the hand position information, and the model corresponding at least a part of the process of specifying the operation command of the robot 2, constructed by machine learning based on the collection data. The operation module 600 acquires the image information from the image sensor 4 and acquires the hand position information of the hand 3 from the robot controller 5. In some examples, the operation module 600 sequentially executes the operation command during the gripping operation of the robot 2.

Figure 5A:
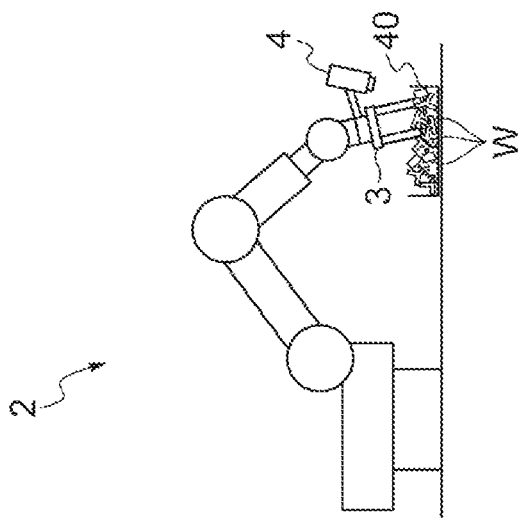
FIGS. 5A to 5C are schematic diagrams illustrating an example gripping operation of a robot.
Figure 5B:
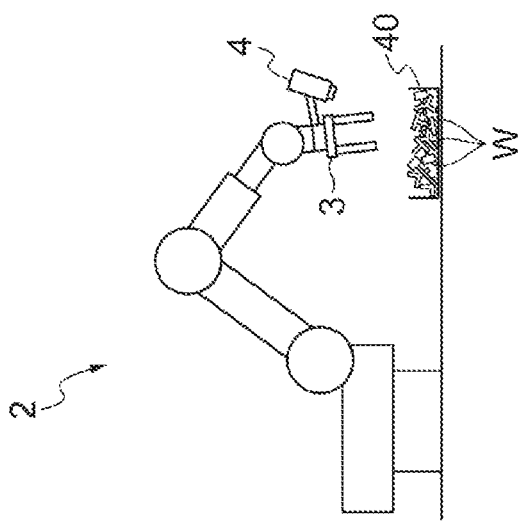
Figure 5C:
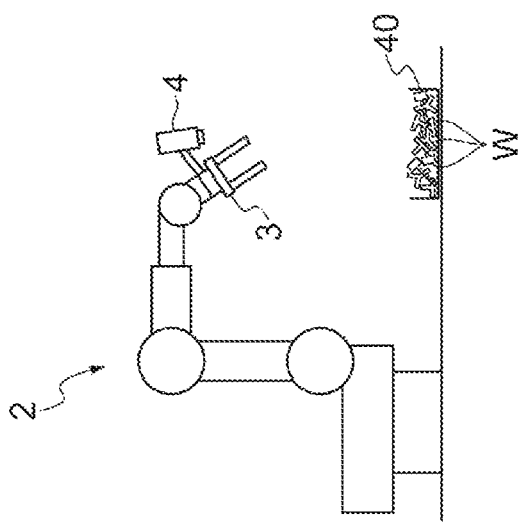

The sequential operation of the operation command by the operation module 600 will be described using FIGS. 5A to 5C. FIGS. 5A to 5C are schematic diagrams illustrating an example of the gripping operation of the robot 2. FIG. 5A is a diagram illustrating a position and a posture of the robot 2 at the time of starting the gripping operation. In FIG. 5A, a gripping operation start time is set to 0. FIG. 5B is a diagram illustrating a position and a posture of the robot 2 at time t (0<t<T). FIG. 5C is a diagram illustrating a position and a posture of the robot 2 at time T. At the time T, the robot 2 is in a gripping state in which the robot 2 grips the workpiece W. At the time t, the operation module 600 generates, specifies or selects a gripping target position to be a final position of the hand 3 at timing (time T) at which the workpiece W is gripped, based on the image information at the time t. The operation module 600 acquires the image information at each time t and generates, specifies or selects the gripping target position. As described above, the operation module 600 sequentially derives, executes, actuates, generates, specifies or selects the operation command at each time t and outputs the operation command to the robot controller 5.

For example, the operation module 600 may include a position generation module 601, a determination module 602, an extraction module 603, an output module 604, and a calculation module 605. The operation module 600 does not need to include all of the position generation module 601, the determination module 602, the extraction module 603, the output module 604, and the calculation module 605. Rather, in some examples the operation module 600 includes at least one of the position generation module 601, the determination module 602, the extraction module 603, the output module 604, and the calculation module 605.

The position generation module 601 generates a recognition result of the workpiece W, based on the image information acquired by the image sensor 4. The recognition result of the workpiece W includes position information of the workpiece W. The position information of the workpiece W shows a position of the workpiece W in an image generated based on the image information. The recognition result of the workpiece W includes the position and the size of the workpiece W, as an example. The position and the size of the workpiece W may be represented using bounding boxes.

Figure 6:
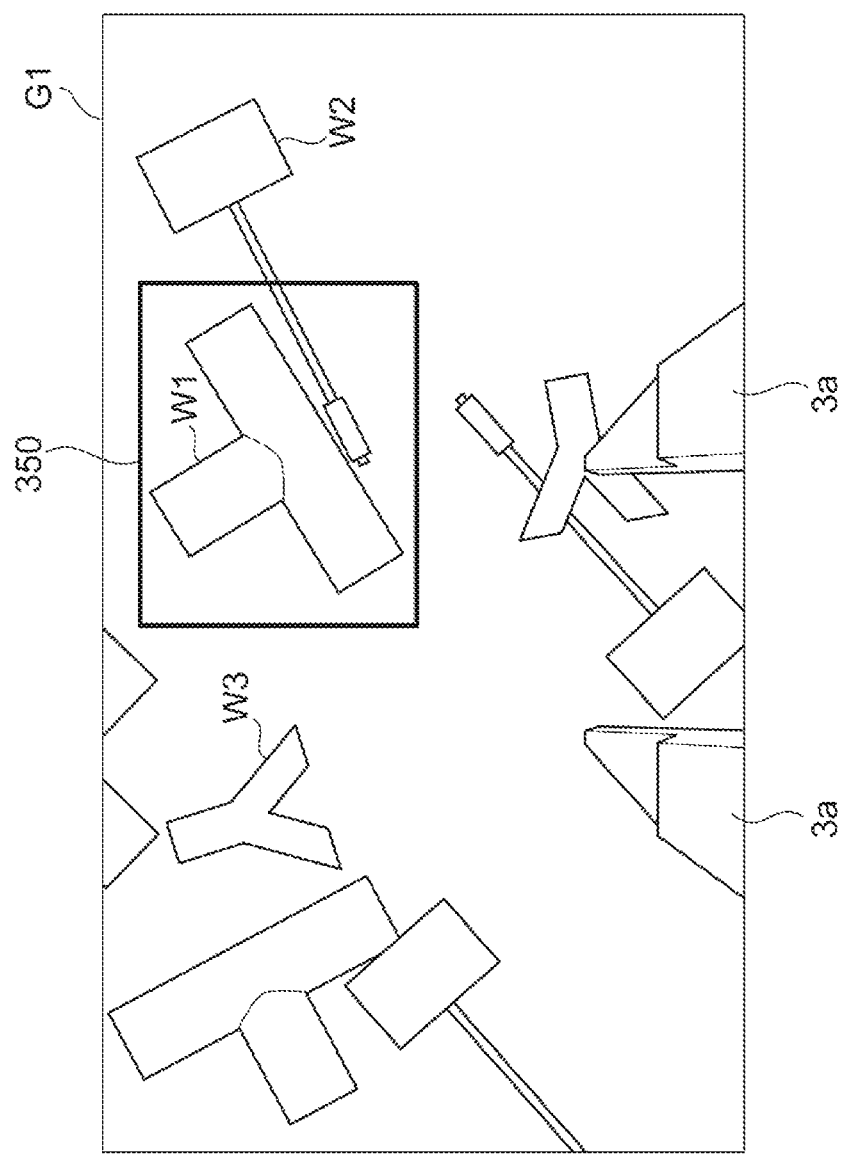
FIG. 6 is a diagram illustrating an example recognition result of a workpiece W.

FIG. 6 illustrates an example recognition result of the workpiece W. An image G1 shown in FIG. 6 may be generated based on the image information acquired by the image sensor 4. In the image G1, a plurality of workpieces (for example, a first workpiece W1, a second workpiece W2, and a third workpiece W3) are drawn. In the image G1, a bounding box 350 which is a recognition result of the first workpiece W1 is displayed. A position and a size of the first workpiece W1 are represented by the coordinates of a left corner of the bounding box 350 on a coordinate axis of the image and an aspect ratio thereof. In FIG. 6, the claw members 3a which are the tips of the hand 3 are included in the image information.

The recognition result of the workpiece W may include a type of the workpiece W. As the recognition result of the workpiece W, one type is selected from a plurality of types set in advance. The recognition result of the workpiece W may include a gripping expectation value. The gripping expectation value includes an index showing easiness of gripping. The position generation module 601 receives the image information at the time t and outputs recognition results of all workpieces W drawn in the image at the time t. In some examples, when the plurality of workpieces W are drawn in the image, the position generation module 601 generates a recognition result of each of the plurality of workpieces W based on the image information.

The position generation module 601 may generate the recognition result of the workpiece W using a position model. The position model is at least a part of the process of specifying the operation command of the robot 2. The position model may correspond to the recognition process of recognizing the workpiece W from the image information.

The position model receives the image information and outputs the recognition result of the workpiece W. As an example, the position model receives the image information and outputs position information of the plurality of workpieces W and respective gripping expectation values of the plurality of workpieces W. The position model is stored in a position model storage module 611.

Figure 7:
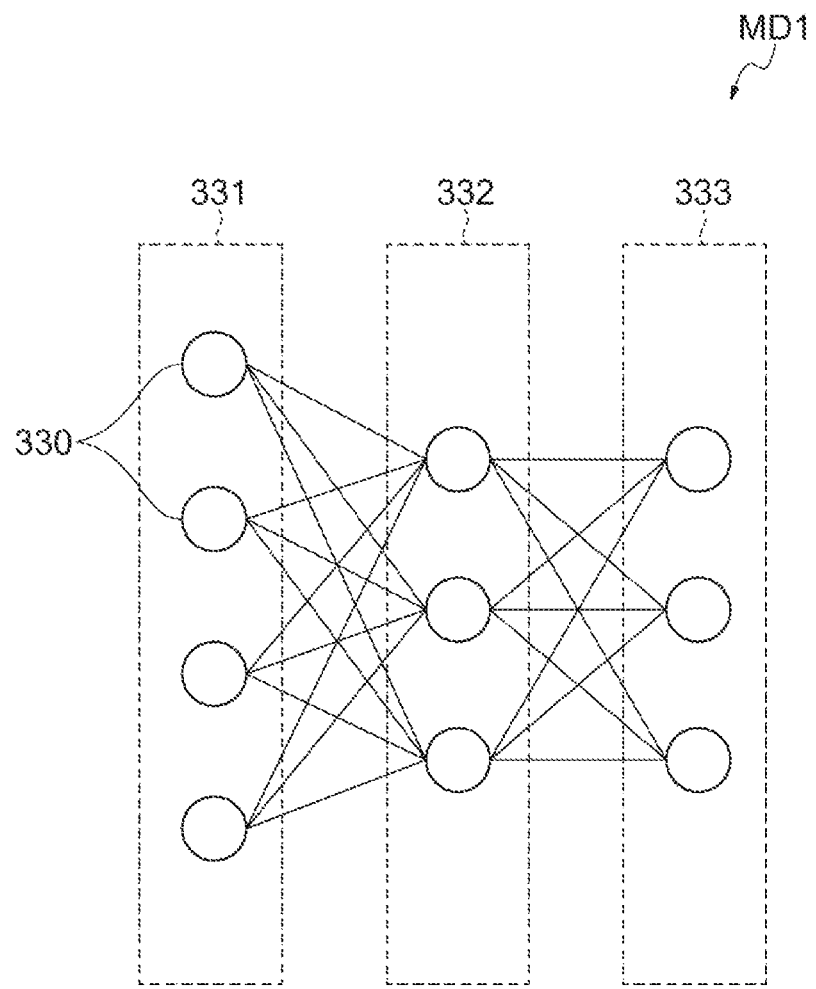
FIG. 7 is a diagram illustrating an example neural network configuring a model.

For example, the position model may include a neural network. FIG. 7 illustrates an example neural network configuring a model. As illustrated in FIG. 7, a position model MD1 may include an aggregation of nodes 330. Each of the nodes 330 is connected to at least one node 330. Weights are set between the connected nodes. The aggregation of the nodes includes an aggregation that functions as an input layer 331 receiving data, an aggregation that functions as an intermediate layer 332 performing an operation using a weight, and an aggregation that functions as an output layer 333 outputting a result. The input layer 331 has the number of nodes corresponding to the number of input data. The output layer 333 has the number of nodes corresponding to the number of contents of an output result. The intermediate layer 332 is appropriately set corresponding to the number of the input layer 331 and the output layer 333. The neural network may include a plurality of intermediate layers 332. In the position model MD1, the input layer 331 receives the image information and the output layer 333 outputs the recognition result of the workpiece W.

The determination module 602 may determine one workpiece W to be a gripping object. As an example, the determination module 602 determines a gripping object based on the recognition result of the workpiece W recognized by the position generation module 601. In some examples, the determination module 602 determines a gripping object based on a gripping expectation value of the workpiece W recognized by the position generation module 601. By way of further example, the determination module 602 may determine a workpiece having a highest gripping expectation value among the plurality of workpieces as the gripping object.

The extraction module 603 extracts a feature amount corresponding to the workpiece W, based on the image information acquired by the image sensor 4 and the position information of the workpiece W included in the image information. The workpiece W from which a feature amount is to be extracted is, for example, one workpiece W determined by the determination module 602. For example, the extraction module 603 extracts a feature amount corresponding to the workpiece W, based on the image information acquired by the image sensor 4 and the position information of the workpiece W recognized by the position generation module 601. The feature amount corresponding to the workpiece W is, for example, a value related to an arrangement state of the workpiece W viewed from the viewpoint of the image information and derived from the image information of the workpiece W. The feature amount may include information which is visually recognizable by people, such as an outline, a shape, a size, and a color. In some examples, the feature amount may include other types of features, for example, a feature amount of the workpiece W obtained from the image information at the time t, that is, a viewpoint at the time t.

The extraction module 603 may extract a feature amount corresponding to the workpiece W, based on a plurality of image information having different viewpoints and position information of the same workpiece W included in each of the plurality of image information. The plurality of image information having the different viewpoints may include a plurality of image information including at least image information imaged from a first viewpoint and image information imaged from a second viewpoint different from the first viewpoint. The image information imaged from the first viewpoint may include, for example, the image information acquired by the image sensor 4 at the time of starting the gripping operation (FIG. 5A; time 0). Additionally, the image information imaged from the second viewpoint may include, for example, the image information acquired by the image sensor 4 during the gripping operation (FIG. 5B; time t). In some examples, the same workpiece W means that a workpiece recognized based on the image information imaged from the first viewpoint, is the same as a workpiece recognized based on the image information imaged from the second viewpoint different from the first viewpoint.

The extraction module 603 may extract a feature amount using an extraction model. The extraction model may include at least a part of the process of specifying the operation command of the robot 2. Additionally, the extraction model may correspond to the extraction process of extracting the feature amount corresponding to the workpiece W from the image information. The extraction model receives the image information and the position information of the workpiece W and outputs the feature amount corresponding to the workpiece W. The extraction model is stored in an extraction model storage module 613.

In some examples, the extraction model includes a neural network. A configuration of the neural network has an input layer, an intermediate layer, and an output layer, similar to the position model MD1 of FIG. 7. In the extraction model, the input layer receives the image information and the position information of the workpiece W and the output layer outputs the feature amount corresponding to the workpiece W.

The output module 604 outputs an operation command of the robot 2 based on the feature amount of the workpiece W extracted from the image information acquired by the image sensor 4 and the hand position information. As an example, the output module 604 outputs an operation command of the robot 2 based on the feature amount of the workpiece W extracted by the extraction module 603 and the hand position information. The hand position information may include information of at least one of the position and the posture of the hand 3 at the time when the image information has been acquired. For example, the output module 604 receives the image information at the time t and the hand position information at the time t as an input. The output module 604 outputs the gripping target position as an example of the operation command.

The output module 604 may output an operation command using a command model. The command model may include at least a part of the process of specifying the operation command of the robot 2. Additionally, the command model may correspond to the command output process of outputting the operation command of the robot 2 based on the feature amount of the gripping object and the position of the hand 3. The command model receives the feature amount of the workpiece W extracted from the image information acquired by the image sensor 4 and the hand position information and outputs the operation command of the robot 2. The command model is stored in a command model storage module 614.

In some examples, the command model includes a neural network. A configuration of the neural network has an input layer, an intermediate layer, and an output layer, similar to the position model MD1 of FIG. 7. In the command model, the input layer receives the feature amount of the workpiece W extracted from the image information acquired by the image sensor 4 and the hand position information and the output layer outputs the operation command of the robot 2.

In the case where the hand 3 is a gripper, the command model may receive an opening/closing degree of the gripper in addition to the feature amount of the workpiece W and the hand position information and may output a target opening/closing degree of the gripper in addition to the operation command. The target opening/closing degree may include a target value of an interval of the claw members 3a of the gripper. In some examples, the output module 604 outputs the operation command and the target opening/closing degree based on the feature amount of the workpiece W, the hand position information, and the opening/closing degree, using the command model. The robot controller 5 operates or actuates the gripper in accordance with the target opening/closing degree.

The calculation module 605 calculates a gripping probability representing a probability that the workpiece can be gripped by the hand 3, based on the operation command of the robot 2 and the feature amount corresponding to the workpiece W. As an example, the calculation module 605 calculates a gripping probability representing a probability that the workpiece can be gripped by the hand 3, based on the operation command of the robot 2 output by the output module 604 and the feature amount corresponding to the workpiece W, extracted by the extraction module 603.

The calculation module 605 may output the gripping probability using a gripping probability calculation model. The gripping probability calculation model may include at least a part of the process of specifying the operation command of the robot 2. Additionally, the gripping probability calculation model may correspond to the gripping probability calculation process of calculating the gripping probability based on the feature amount corresponding to the workpiece W and the operation command of the robot 2. The gripping probability calculation model receives the feature amount corresponding to the workpiece W and the operation command of the robot 2 and outputs the gripping probability. The gripping probability calculation model is stored in a gripping probability model storage module 615.

In some examples, the gripping probability calculation model includes a neural network. A configuration of the neural network has an input layer, an intermediate layer, and an output layer, similar to the position model MD1 of FIG. 7. In the gripping probability calculation model, the input layer receives the feature amount corresponding to the workpiece W and the operation command of the robot 2 and the output layer outputs the gripping probability.

The operation module 600 outputs data calculated in the process of specifying the operation command of the robot 2 as history data to a history storage module 620. The history data includes the time at which the hand position information has been acquired by the output module 604, image information acquired from the image sensor 4 by the position generation module 601, a position of the workpiece W generated by the position generation module 601, a feature amount of the workpiece W extracted by the extraction module 603, an operation command generated by the output module 604, a gripping probability calculated by the calculation module 605, a gripping success/failure, and the like. The history data is configured such that the history data can be referred to by the learning device 7.

The gripping probability stored in the history storage module 620 may be used to determine whether or not the gripping operation of the robot 2 is re-executed, for example. For example, the output module 604 determines whether the gripping probability tends to increase or tends to decrease. In response to a decrease in the gripping probability, the output module 604 outputs an operation command to re-execute the gripping operation of the robot 2. As an example, the output module 604 outputs an operation command to operate the robot 2, such that the robot 2 returns the hand 3 to the position associated with a previous time. In some examples, the previous time may be predetermined. Thereby, the robot controller 5 may operate the robot 2 based on the gripping probability calculated by the calculation module 605.

The gripping probability may be used as a parameter for determining whether or not the robot controller 5 commands the hand 3 to approach the workpiece W. For example, when the gripping probability is equal to or more than a predetermined threshold, the robot controller 5 commands the robot 2 to perform the gripping operation. On the other hand, when the gripping probability is less than the threshold, the robot controller 5 may re-execute one or both operations of commanding the extraction module 603 to extract the feature amount corresponding to the workpiece W and commanding the output module 604 to output the operation command of the robot 2 by the output module 604. As an example, the robot controller 5 may move the hand 3 by a predetermined distance to separate the position of the hand 3 from the workpiece W and may re-execute the operation of commanding the extraction module 603 to extract the feature amount corresponding to the workpiece W, and re-execute the operation of commanding the output module 604 to output the operation command of the robot 2. Alternatively, after the passage of update timing of the weight of the neural network learned by the learning device 7, the robot controller 5 may re-execute the operation of commanding the extraction module 603 to extract the feature amount corresponding to the workpiece W, and re-execute the operation of commanding the output module 604 to output the operation command of the robot 2.

The model acquisition module 610 acquires a learning result from the learning device 7. The model acquisition module 610 acquires network configurations and weight data of the position model, the extraction model, the command model, and the gripping probability calculation model as the learning result. The model acquisition module 610 stores the acquired position model in the position model storage module 611. The model acquisition module 610 stores the acquired extraction model in the extraction model storage module 613. The model acquisition module 610 stores the acquired command model in the command model storage module 614. The model acquisition module 610 stores the acquired gripping probability calculation model in the gripping probability model storage module 615.

[Functional Configuration of Learning Device]

Figure 8:
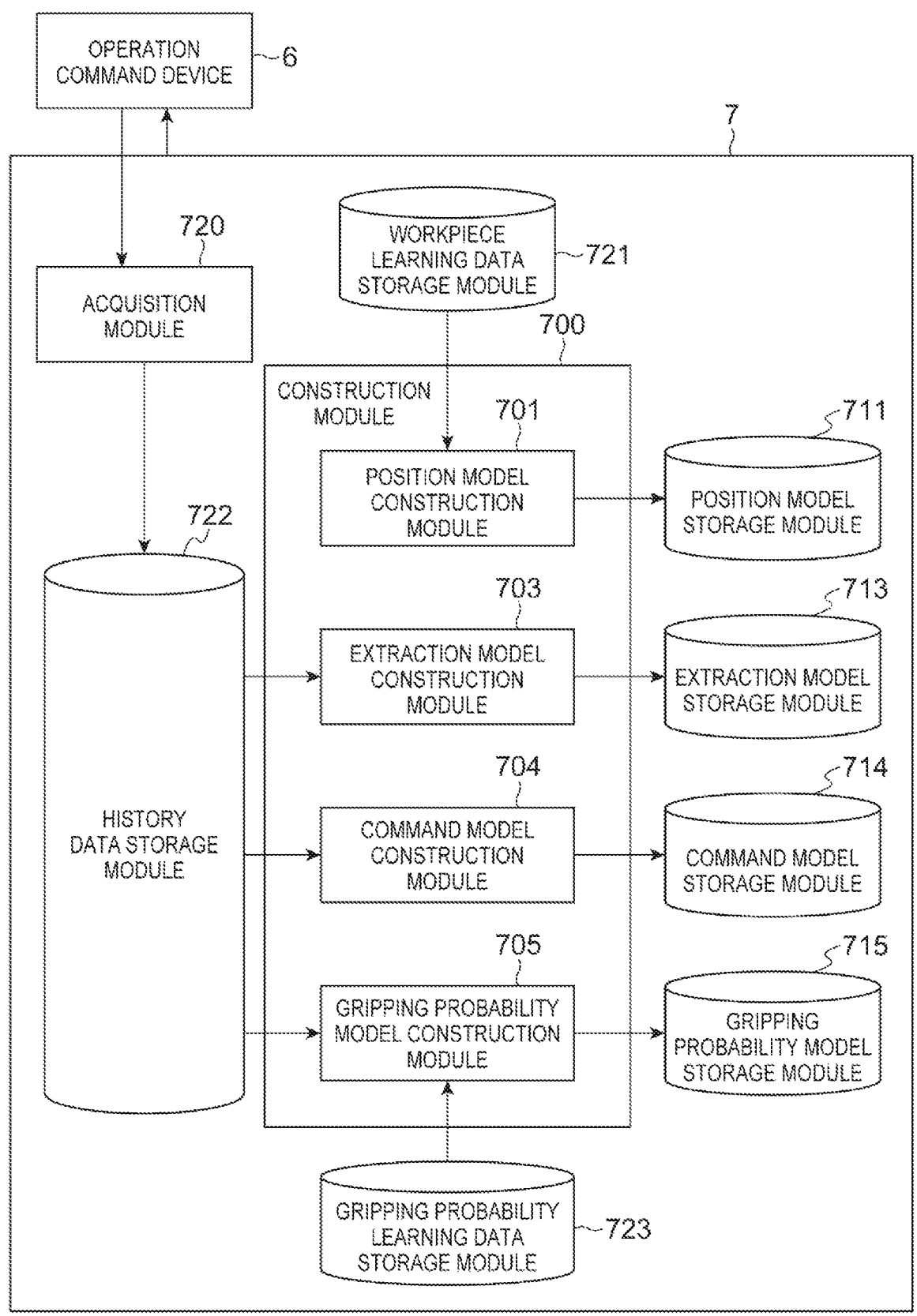
FIG. 8 is a block diagram illustrating an example functional configuration of a learning device.

FIG. 8 is a block diagram illustrating an example functional configuration of the learning device 7. The learning device 7 may include an acquisition module 720 and a construction module 700.

The acquisition module 720 acquires history data from the history storage module 620 of the operation command device 6. As an example, the acquisition module 720 acquires collection data including image information imaged from a viewpoint interlocked with at least one of the position and the posture of the hand 3 gripping the workpiece W and hand position information representing at least one of the position and the posture of the hand 3. The acquisition module 720 stores the history data as the collection data in the history data storage module 722.

In addition to or instead of the data acquired from the operation command device 6, the collection data may include data acquired from other devices. For example, when the gripping system 1 includes the robot 2, the hand 3, the operation module 600, and the robot controller 5 as one set of devices, the acquisition module 720 may acquire an operation history of another set of devices, different from the one set, as the collection data. In some examples, the acquisition module 720 may acquire an operation history of the other set included in the gripping system 1 as the collection data or may acquire an operation history of a set of devices included in another gripping system as the collection data.

The construction module 700 may be configured to construct a model, by machine learning based on the collection data, corresponding to at least a part of the process of specifying the operation command of the robot 2. In some examples, the model may be constructed based on the image information acquired by the image sensor 4 and the hand position information representing at least one of the position and the posture of the hand.

The construction module 700 has a position model construction module 701, an extraction model construction module 703, a command model construction module 704, and a gripping probability model construction module 705. In some examples, the construction module 700 does not include all of the position model construction module 701, the extraction model construction module 703, the command model construction module 704, and the gripping probability model construction module 705. Rather, the construction module 700 may include at least one of the position model construction module 701, the extraction model construction module 703, the command model construction module 704, and the gripping probability model construction module 705.

The position model construction module 701 may be configured to construct a position model by machine learning based on workpiece learning data. The workpiece learning data may include training data for recognizing the workpiece W and may be previously stored in a workpiece learning data storage module 721. Examples of the workpiece learning data include data in which image information of an image of the workpiece W and a profile (for example, a position, a type, and easiness of gripping of the workpiece W in the image) are associated with each other. The position model construction module 701 adjusts the weight of the neural network such that the workpiece W can be recognized from the image information of the image of the workpiece W. The position model construction module 701 stores the constructed position model in a position model storage module 711. The position model storage module 711 is configured such that the operation command device 6 can refer to the position model storage module 711. The position model storage module 711 is used in order to update the position model storage module 611.

The gripping probability model construction module 705 constructs a gripping probability model by machine learning based on the gripping probability learning data. The gripping probability learning data may include training data for calculating the gripping probability and may be stored in a gripping probability learning data storage module 723 in advance. Examples of the gripping probability learning data include data in which image information of an image of the workpiece W, an operation command, and a gripping success/failure are associated with each other. The gripping probability model construction module 705 adjusts the weight of the neural network such that a degree of the gripping probability will be more closely related to a gripping success/failure of a history. In examples where history data sufficient for learning is accumulated in the history data storage module 722, the gripping probability model construction module 705 further adjusts the gripping probability model by machine learning based on the history data stored in the history data storage module 722. Examples of the history data referred to by the gripping probability model construction module 705 include the feature amount of the workpiece W, the operation command, and the gripping success/failure. The gripping probability model construction module 705 further adjusts the weight of the neural network such that the degree of the gripping probability will be more closely related to the gripping success/failure of the history, based on the feature amount of the workpiece W and the operation command. The gripping probability model construction module 705 stores the constructed gripping probability model in the gripping probability model storage module 715. The gripping probability model storage module 715 is configured such that the operation command device 6 can refer to the gripping probability model storage module 715. The gripping probability model storage module 715 is used to update the gripping probability model storage module 615.

The extraction model construction module 703 constructs an extraction model by machine learning based on the history data stored in the history data storage module 722. The extraction model construction module 703 constructs the extraction model when history data sufficient for learning is accumulated in the history data storage module 722. Examples of the history data referred to by the extraction model construction module 703 include the image information, the position information of the workpiece W, and the gripping probability. The history data to be referred to may include the gripping success/failure instead of the gripping probability. The extraction model construction module 703 adjusts the weight of the neural network such that the feature amount of the workpiece W which improves the gripping probability can be extracted from the image information, based on the position information of the workpiece W. The extraction model construction module 703 stores the constructed extraction model in the extraction model storage module 713. The extraction model storage module 713 is configured such that the operation command device 6 can refer to the extraction model storage module 713. The extraction model storage module 713 is used to update the extraction model storage module 613.

The command model construction module 704 constructs a command model by machine learning based on the history data stored in the history data storage module 722. The command model construction module 704 constructs the command model when history data sufficient for learning is accumulated in the history data storage module 722. Examples of the history data referred to by the command model construction module 704 include the feature amount of the workpiece W, the hand position information, the operation command, and the gripping probability. The history data may include the gripping success/failure instead of the gripping probability. The command model construction module 704 adjusts the weight of the neural network such that the operation command which improves the gripping probability can be output, based on the feature amount of the workpiece W and the hand position information. The command model construction module 704 stores the constructed command model in the command model storage module 714. The command model storage module 714 is configured such that the operation command device 6 can refer to the command model storage module 714. The command model storage module 714 is used to update the command model storage module 614.

The gripping system 1 may include other types of hardware configurations compatible with the functions of the robot controller 5, the operation command device 6, and the learning device 7 described above. For example, the operation command device 6 and the learning device 7 may be one hardware resource, the robot controller 5 and the operation command device 6 may be one hardware resource, the robot controller 5 and the learning device 7 may be one hardware resource, or the robot controller 5, the operation command device 6, and the learning device 7 may be one hardware resource. One hardware resource may be understood to include a resource that is integrated in appearance.

In some examples, the internal hardware configurations of the operation command device 6 and the learning device 7 may be combined for one or more (or each) of the functional configurations described above. The hardware configurations of the operation command device 6 and the learning device 7 may include configurations in which each function is exhibited by executing a program. In other examples, at least a part of each functional module may be configured by a logic circuit specialized for the function thereof or may be configured by an application specific integrated circuit (ASIC) in which the logic circuit is integrated.

The models of the operation command device 6 and the learning device 7 may include one neural network. One neural network may be constructed by a series of machine learning.

(Gripping Procedure)

Figure 9:
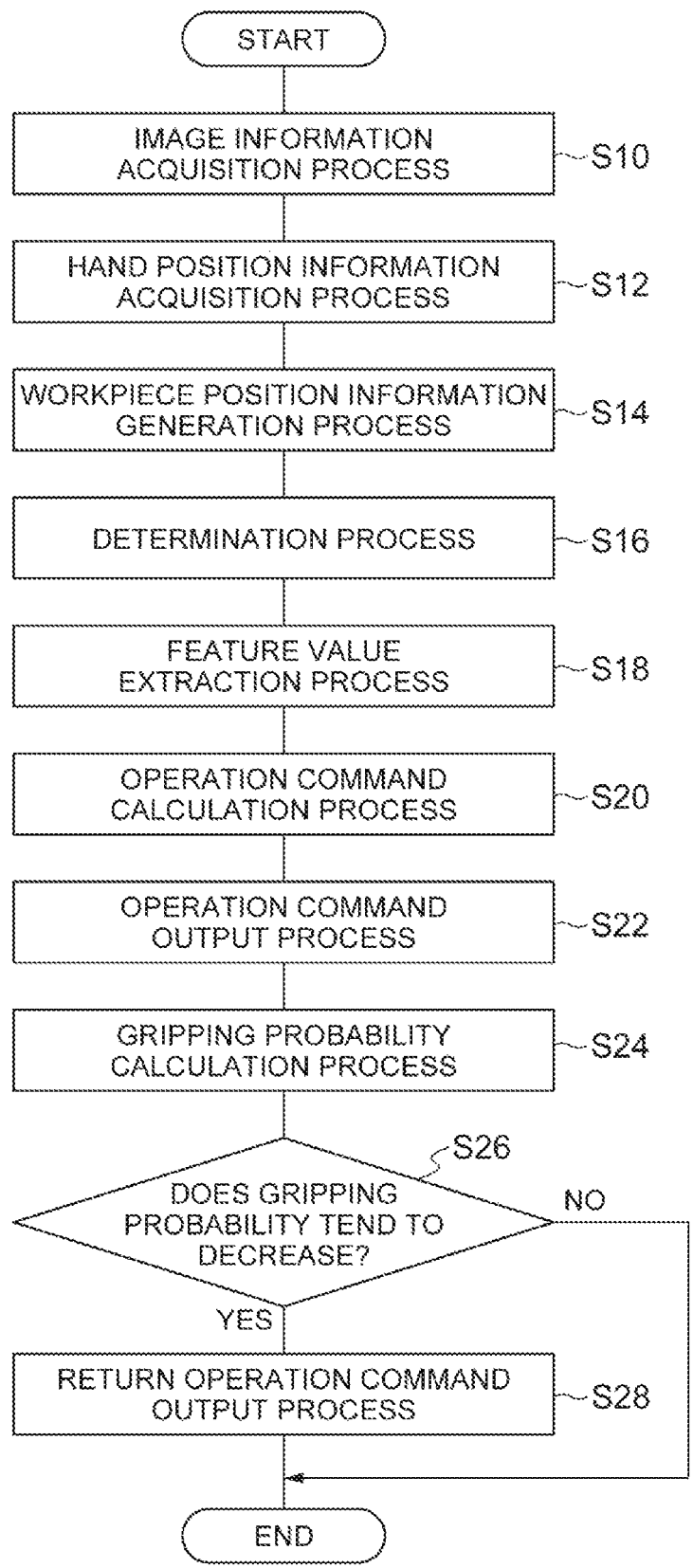
FIG. 9 is a diagram illustrating a flowchart of an example gripping procedure.

FIG. 9 illustrates a flowchart of an example gripping procedure which may be executed by a processing device, such as the operation command device 6. In some examples, the operation command device 6 may be configured to sequentially execute some or all of steps illustrated in FIG. 9 and as further described below.

In step S10, the position generation module 601 acquires image information from the image sensor 4.

In step S12, the output module 604 acquires hand position information from the robot controller 5.

In step S14, the position generation module 601 generates position information of the workpiece W based on the image information acquired in step S10.

In step S16, the determination module 602 determines one workpiece W based on the position information of the workpiece W generated in step S14.

In step S18, the extraction module 603 extracts a feature amount of one workpiece W determined in step S16, based on the image information acquired in step S10.

In step S20, the output module 604 calculates an operation command of the robot 2 based on the hand position information and the feature amount of the workpiece W extracted in step S18.

In step S22, the output module 604 outputs the operation command calculated in step S20 to the robot controller 5.

In step S24, the calculation module 605 calculates a gripping probability based on the feature amount of the workpiece W extracted in step S18 and the operation command calculated in step S20.

In step S26, the output module 604 determines whether or not the gripping probability calculated in step S24 tends to decrease.

In step S26, when it is determined that the gripping probability calculated in step S24 tends to decrease, the operation command device 6 executes step S28. In step S28, the output module 604 outputs an operation command such that the robot returns to the position of the hand 3 a predetermined time before.

In step S26, when it is determined that the gripping probability calculated in step S24 does not tend to decrease or when step S28 ends, the operation command device 6 ends the process.

In FIG. 9, step S10 may be executed at a timing that is earlier than step S14 and may be executed between step S12 and step S14. Step S12 may be executed at any timing earlier than step S20. Step S22 may be executed after step S24. In some examples, step S26 and step S28 are not executed and when the gripping probability calculated in step S24 is equal to or more than a predetermined threshold, step S22 may be executed and when the gripping probability is less than the threshold, the process may be re-executed from step S14, step S16, or step S18.

(Position Model Learning Procedure)

Figure 10:
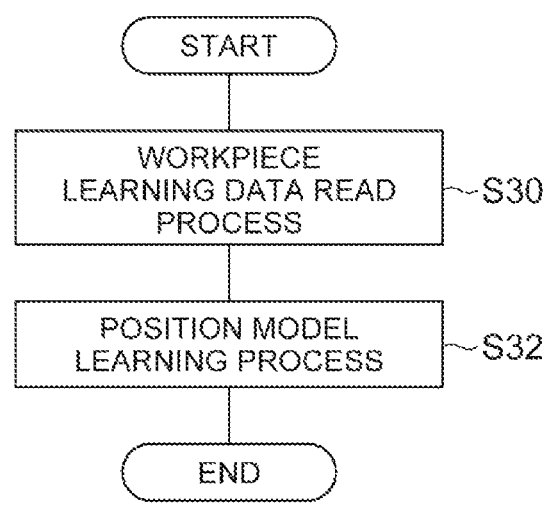
FIG. 10 is a diagram illustrating a flowchart of an example position model learning procedure.

As an example of the learning method, a position model learning procedure (an example of a model manufacturing method) will be described. FIG. 10 illustrates a flowchart of an example position model learning procedure which may be executed by a processing device, such as the learning device 7. In some examples, the learning device 7 may be configured to sequentially execute some or all of steps illustrated in FIG. 10 and as further described below.

In step S30, the position model construction module 701 reads workpiece learning data from the workpiece learning data storage module 721.

In step S32, the position model construction module 701 constructs a position model. The position model construction module 701 adjusts the weight of the neural network such that the workpiece W can be recognized from the image information of the image of the workpiece W. The position model construction module 701 stores a learning result in the position model storage module 711.

When step S32 ends, the learning device 7 ends the process.

(Gripping Probability Model Learning Procedure)

Figure 11:
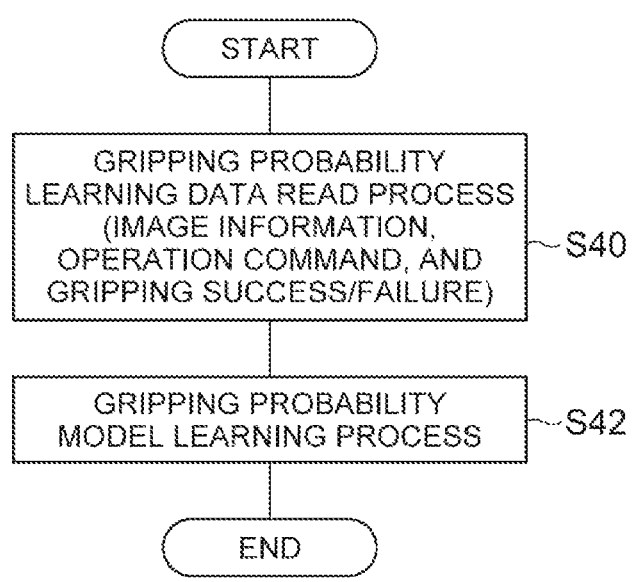
FIG. 11 is a diagram illustrating a flowchart of an example gripping probability model learning procedure.

As an example of the learning method, a gripping probability model learning procedure (an example of a model manufacturing method) will be described. FIG. 11 illustrates a flowchart of an example gripping probability model learning procedure which may be executed by a processing device, such as the learning device 7. In some examples, the learning device 7 may be configured to sequentially execute some or all of steps illustrated in FIG. 11 and as further described below.

In step S40, the gripping probability model construction module 705 reads gripping probability learning data from the gripping probability learning data storage module 723. Examples of the gripping probability learning data include the image information, the operation command, and the gripping success/failure.

In step S42, the gripping probability model construction module 705 constructs a gripping probability model. The gripping probability model construction module 705 adjusts the weight of the neural network such that the degree of the gripping probability will be more closely related to the gripping success/failure of the history, based on the image information, the operation command, and the gripping success/failure. The gripping probability model construction module 705 stores a learning result in the gripping probability model storage module 715.

When step S42 ends, the learning device 7 ends the process.

(Learning Procedure of Extraction Model, Command Model, and Gripping Probability Model)

Figure 12:
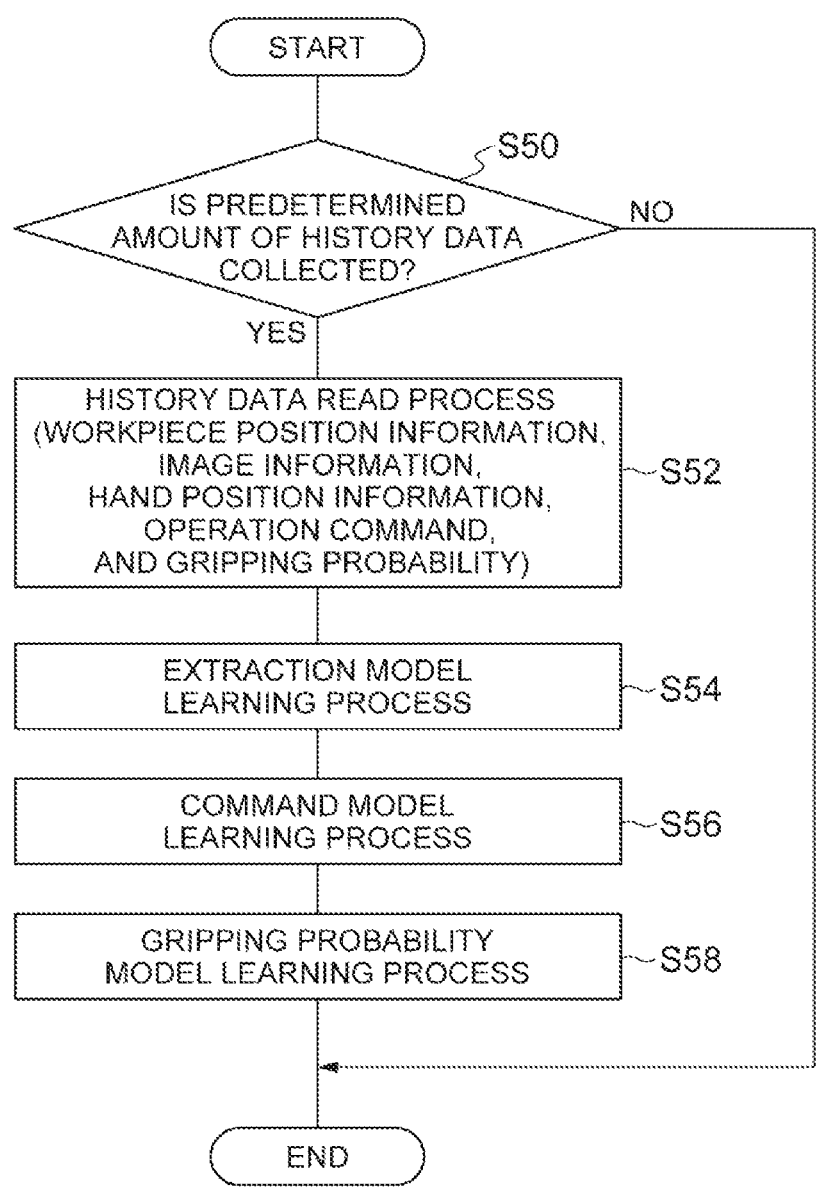
FIG. 12 is a diagram illustrating a flowchart of an example learning procedure of an extraction model, a command model, and a gripping probability model.

As an example of the learning method, a learning procedure (an example of a model manufacturing method) of the extraction model, the command model, and the gripping probability model executed by a processing device, such as the learning device 7, will be described. FIG. 12 illustrates a flowchart of an example learning procedure of the extraction model, the command model, and the gripping probability model. In some examples, the learning device 7 may be configured to sequentially execute some or all of steps illustrated in FIG. 12 and as further described below.

In step S50, each of the extraction model construction module 703, the command model construction module 704, and the gripping probability model construction module 705 determines whether or not history data sufficient for learning (a predetermined amount of data) is accumulated in the history data storage module 722. When the extraction model construction module 703, the command model construction module 704, and the gripping probability model construction module 705 perform learning as a unit, as an example, the extraction model construction module 703 determines whether or not the history data sufficient for learning (a predetermined amount of data) is accumulated in the history data storage module 722.

In step S50, when it is determined that the history data sufficient for learning (a predetermined amount of data) is accumulated in the history data storage module 722, the learning device 7 executes step S52. In step S52, each of the extraction model construction module 703, the command model construction module 704, and the gripping probability model construction module 705 reads the history data. For example, the extraction model construction module 703 reads the position information, the image information, and the gripping probability of the workpiece W to be the history data. For example, the command model construction module 704 reads the feature amount of the workpiece W, the hand position information, and the history data of the gripping probability. The gripping probability model construction module 705 reads the feature amount of the workpiece W, the operation command, and the gripping success/failure.

In step S54, the extraction model construction module 703 constructs an extraction model. The extraction model construction module 703 adjusts the weight of the neural network such that the feature amount of the workpiece W which improves the gripping probability can be extracted from the image information, based on the image information, the position information of the workpiece, and the gripping probability. The extraction model construction module 703 stores the learning result in the extraction model storage module 713.

In step S56, the command model construction module 704 constructs a command model. The command model construction module 704 adjusts the weight of the neural network such that the operation command which improves the gripping probability can be output, based on the feature amount of the workpiece, the hand position information, and the gripping probability. The command model construction module 704 stores the learning result in the command model storage module 714.

In step S58, the gripping probability model construction module 705 constructs a gripping probability model. The gripping probability model construction module 705 further adjusts the weight of the neural network such that the degree of the gripping probability will be more closely related to the gripping success/failure of the history, based on the feature amount of the workpiece W and the operation command.

The gripping probability model construction module 705 stores the constructed gripping probability model in the gripping probability model storage module 715.

When it is determined in step S50 that the history data sufficient for learning (a predetermined amount of data) is not accumulated in the history data storage module 722 or when step S58 ends, the learning device 7 ends the process.

In steps S52 to S58 described above, the extraction model construction module 703, the command model construction module 704, and the gripping probability model construction module 705 may perform learning as a unit. In some examples, the extraction model construction module 703 reads the position information of the workpiece W, the image information, the hand position information, the gripping probability, and the gripping success/failure. In addition, the extraction model construction module 703, the command model construction module 704, and the gripping probability model construction module 705 may be configured as one neural network and perform learning by a series of machine learning. As described above, the extraction model, the command model, and the gripping probability model may be combined and learning may be performed.

As described above, the gripping system 1 includes the hand 3 that grips the workpiece W, the robot 2 that supports the hand 3 and changes at least one of the position and the posture of the hand 3, and the image sensor 4 that acquires the image information from the viewpoint interlocked with at least one of the position and the posture of the hand 3. Additionally, the construction module 700 constructs the model, by machine learning based on the collection data, corresponding to at least a part of the process of specifying the operation command of the robot 2 based on the image information acquired by the image sensor 4 and the hand position information representing at least one of the position and the posture of the hand 3. The operation module 600 derives, executes, actuates, generates, specifies or selects the operation command of the robot 2, based on the image information, the hand position information, and the model. Additionally, the gripping system may further include the robot controller 5 that operates the robot 2 based on the operation command of the robot 2.

The model may be constructed based on the image information acquired from the viewpoint interlocked with the hand 3 and the position of the hand 3. In some examples, the model may be constructed by machine learning by the construction module 700. Additionally, the operation command is output from the model. Because the operation command is acquired by machine learning based on the image information acquired from the viewpoint interlocked with at least one of the position and the posture of the hand 3, a distance sensor, a 3D CAD model, and a collation process between a detection result of the distance sensor and the 3D CAD model may all be omitted. In addition, machine learning may reduce the reliance on human operators. Therefore, the gripping system 1 is effective for improving efficiency of the gripping operation of the robot.

The operation module 600 may include the extraction module 603 that extracts the feature amount corresponding to the workpiece W, based on the image information and the position information of the workpiece W included in the image information. Additionally, the operation module 600 may include the output module 604 that outputs the operation command of the robot 2 based on the feature amount extracted by the extraction module 603 and the hand position information. In some examples, the feature amount can be extracted from the image information and the position information of the workpiece W by the extraction module 603 and the operation command of the robot 2 can be output from the extraction amount and the hand position information. Therefore, learning efficiency is improved and a gripping success probability is also improved.

The extraction module 603 may extract a feature amount corresponding to the workpiece W, based on a plurality of image information having different viewpoints and position information of the same workpiece W included in each of the plurality of image information. In some examples, by using the positions of the workpieces W included in the images having the different viewpoints, the feature amount can be extracted more accurately and a more accurate operation command can be output.

The construction module 700 may include the extraction model construction module 703 that constructs the extraction model receiving the image information and the position information and outputting the feature amount by machine learning based on the collection data. Additionally, the construction module may include the command model construction module 704 that constructs the command model receiving the feature amount and the hand position information and outputting the operation command by machine learning based on the collection data. The extraction module 603 may extract the feature amount using the extraction model, and the output module 604 may output the operation command using the command model. In some examples, the extraction of the feature amount of the gripping object and the determination of the operation for gripping the gripping object can be automatically performed. In particular, according to the combination of the two models, accuracy of the operation command is improved.

The hand 3 may be a gripper, and the command model construction module 704 may construct the command model receiving the opening/closing degree of the gripper in addition to the feature amount and the hand position information and outputting the target opening/closing degree of the gripper in addition to the operation command. Additionally, the output module 604 may output the operation command and the target opening/closing degree based on the feature amount, the hand position information, and the opening/closing degree, using the command model. In some examples, the robot controller 5 may operate the gripper in accordance with the target opening/closing degree in order to output an appropriate opening/closing degree of the gripper with respect to the gripping object.

The image sensor 4 may be arranged such that the tip of the hand 3 is included in the image information. In some examples, the tip shape of the hand 3 can be recognized from the image information and machine learning can be performed. Therefore, gripping accuracy can be further improved. Particularly, when the hand 3 is the gripper, accuracy of opening/closing of the gripper is also improved.

The operation module 600 may further include the calculation module 605 that calculates the gripping probability representing the probability that the workpiece can be gripped by the hand, based on the operation command of the robot 2 and the feature amount corresponding to the workpiece W. The robot controller 5 may operate the robot 2 based on the gripping probability calculated by the calculation module 605. In some examples, the robot can be operated in accordance with the gripping probability. At this time, accuracy of the gripping probability can be improved by using the feature amount.

The construction module 700 may further have the gripping probability model construction module 705 that constructs the gripping probability model receiving the operation command of the robot 2 and the feature amount corresponding to the workpiece W and outputting the gripping probability, by machine learning based on the collection data. Additionally, the calculation module 605 may calculate the gripping probability using the gripping probability model. In some examples, the gripping probability by the determined operation can be automatically acquired by machine learning.

When the gripping probability is equal to or more than the predetermined threshold, the robot controller 5 may command the robot 2 to perform the gripping operation. On the other hand, when the gripping probability is less than the threshold, the robot controller 5 may re-execute both of the operations including commanding the extraction module 603 to extract the feature amount corresponding to the workpiece and commanding the output module 604 to output the operation command of the robot. In this case, the probability of the gripping failure can be reduced.

The operation module 600 may further include the position generation module 601 that generates the position information of the plurality of workpieces W and the respective gripping expectation values of the plurality of workpieces, based on the image information acquired by the image sensor 4. Additionally, the operation module 600 may include the determination module 602 that determines one workpiece of the gripping object, based on the gripping expectation values, and the extraction module 603 that extracts the feature amount corresponding to the one workpiece, based on the image information and the position information of one workpiece. By using the gripping expectation values, the gripping object can be determined in consideration of easiness of gripping. As a result, the gripping success probability can be improved.

The construction module 700 may further include the position model construction module 701 that constructs the position model, by machine learning based on the collection data, that receives the image information, and that outputs the position information of the plurality of workpieces and the respective gripping expectation values of the plurality of workpieces. Additionally, the position generation module 601 may generate the position information and the gripping expectation values using the position model. In some examples, the gripping expectation value of each workpiece can be automatically acquired by machine learning.

The gripping system 1 may include at least the robot 2, the hand 3, the operation module 600, and the robot controller 5 as one set and the construction module may construct the model by machine learning, based on collection data of an operation history of another set different from the one set as the collection data. Additionally, the operation module 600 of the one set may operate the operation command of the robot 2 of the one set, based on the model. In some examples, because a learning result obtained from other robot can be diverted, portability of the learning result can be enhanced.

Whereas some of the steps (e.g., with respect to FIGS. 9-12) are described as being executed by one or more "modules," in some example embodiments some or all of the steps may be performed by one or more processing devices and/or hardware devices, and as further described above with respect to the example device and hardware configurations illustrated in FIGS. 1-8.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coming within the spirit and scope of the subject matter claimed herein.

What is claimed is:

1. A gripping system comprising:
a robotic hand configured to grip a workpiece;
a robot configured to support the robotic hand and to change a position of the robotic hand;
an image sensor fixed to the robotic hand to acquire image information from a viewpoint interlocked with the robotic hand; and
circuitry configured to:
input the image information and hand position information of the robotic hand to a system model including an extraction model and a command model constructed by machine learning based on collection data to output an operation command for operating the robot to grip the workpiece;
input the image information to the extraction model in order to output a feature amount corresponding to the workpiece in response to receiving the image information;
input the feature amount output by the extraction model and the hand position information to the command model in order to output the operation command in response to receiving the feature amount and the hand position information; and
operate the robot based on the operation command output by the command model.

2. The gripping system according to claim 1,
wherein the extraction model is constructed to output the feature amount in response to receiving, together with the image information, workpiece position information of the workpiece included in the image information, and
wherein the circuitry is further configured to input the workpiece position information together with the image information to the extraction model.

3. The gripping system according to claim 2, wherein the robotic hand comprises a gripping device,
wherein the command model is constructed to output the operation command and a target opening/closing degree of the gripping device, in response to receiving, together with the feature amount and the hand position information, an opening/closing degree of the gripping device, and
wherein the circuitry is further configured to:
input the opening/closing degree of the gripping device together with the feature amount and the hand position information to the command model; and
operate the gripping device in accordance with the target opening/closing degree output by the command model.

4. The gripping system according to claim 1, wherein the image sensor is disposed such that a tip of the robotic hand is included in the image information.

5. The gripping system according to claim 1, wherein the circuitry is further configured to:
calculate a gripping probability representing a probability that the workpiece can be gripped by the robotic hand, based on the operation command of the robot and the feature amount corresponding to the workpiece; and
operate the robot further based on the gripping probability.

6. The gripping system according to claim 5, wherein the system model further comprises a gripping probability model constructed by machine learning based on the collection data to output the gripping probability in response to receiving the operation command and the feature amount, and wherein the circuitry is further configured to input the operation command output by the command model to the gripping probability model to calculate the gripping probability.

7. The gripping system according to claim 5, wherein, the circuitry is further configured to:

operate the robot based on the operation command if the gripping probability is equal to or more than a predetermined threshold; and cancel an operation of the robot based on the operation command if the gripping probability is less than the threshold.

8. The gripping system according to claim 2, wherein the circuitry is further configured to:

generate candidate position information of a plurality of workpieces and respective gripping expectation values of the plurality of workpieces, based on the image information;

select the workpiece from the plurality of workpieces, based on the gripping expectation values; and input the workpiece position information of the selected workpiece to the extraction model.

9. The gripping system according to claim 8, wherein the system model further comprises a position model constructed by machine learning based on the collection data to output the candidate position information and the gripping expectation values, and wherein the circuitry is further configured to input the image information to the position model to generate the candidate position information and the gripping expectation values using the position model.

10. The gripping system according to claim 1, wherein the circuitry is further configured to construct the system model by machine learning based on the collection data.

11. The gripping system according to claim 10, wherein the circuitry is further configured to construct the system model by machine learning, based on collection data of an operation history of another robot different from the robot.

12. The gripping system according to claim 1, wherein the operation command includes information indicating target position of the robotic hand for gripping the workpiece.

13. The gripping system according to claim 2, wherein the workpiece position information comprises a position of the workpiece in an image based on the image information.

14. The gripping system according to claim 1, wherein the feature amount comprises a value related to an arrangement state of the workpiece from a viewpoint of the image information.

15. A learning device comprising circuitry configured to:

acquire image information imaged from a viewpoint interlocked with a robotic hand configured to grip a workpiece, wherein the robotic hand is supported by a robot configured to change a position of the robotic hand;

acquire hand position information of the robotic hand, wherein the hand position information and the image information are combined as collection data; and construct, by machine learning based on the collection data, a system model including an extraction model and a command model to output an operation command for operating the robot to grip the workpiece, wherein the image information is input to the extraction model in order to output a feature amount corresponding to the workpiece in response to receiving the image information, wherein the feature amount output by the extraction model and the hand position information are input to the command model in order to output the operation command in response to receiving the feature amount and the hand position information, and wherein the robot is operated based on the operation command output by the command model.

16. A gripping method comprising:

acquiring image information from a viewpoint interlocked with a robotic hand configured to grip a workpiece, wherein the robotic hand is supported by a robot configured to change a position of the robotic hand;

acquiring hand position information of the robotic hand;

inputting the image information and the hand position information to a system model including an extraction model and a command model constructed by machine learning based on collection data to output an operation command for operating the robot to grip the workpiece;

inputting the image information to the extraction model in order to output a feature amount corresponding to the workpiece in response to receiving the image information;

inputting the feature amount output by the extraction model and the hand position information to the command model in order to output the operation command in response to receiving the feature amount and the hand position information; and operating the robot based on the operation command output by the command model.

17. The gripping method according to claim 16, further comprising constructing the system model by machine learning based on the collection data.

18. The gripping method according to claim 16, wherein the collection data comprises the image information and the hand position information.

19. The gripping method according to claim 16, wherein the image information includes a tip of the robotic hand.

20. The learning device according to claim 15, wherein the image information includes a tip of the robotic hand.

* * * * *